United States Patent

Wang et al.

[11] Patent Number: 5,989,620
[45] Date of Patent: Nov. 23, 1999

[54] PRODUCTION OF LEGUME PASTA PRODUCTS BY A HIGH TEMPERATURE EXTRUSION PROCESS

[75] Inventors: Ning Wang; Robert T. Tyler; Frank W. Sosulski; Prakash R. Bhirud, all of Saskatoon, Canada

[73] Assignee: University of Saskatchewan, Saskatoon, Canada

[21] Appl. No.: 08/933,877

[22] Filed: Sep. 19, 1997

Related U.S. Application Data

[60] Provisional application No. 60/026,411, Sep. 20, 1996.

[51] Int. Cl.$^6$ ....................................................... A23L 1/20
[52] U.S. Cl. ......................... 426/634; 426/443; 426/451; 426/516; 426/629; 426/557
[58] Field of Search .................................... 426/634, 443, 426/451, 516, 629, 557

[56] References Cited

U.S. PATENT DOCUMENTS

| | | |
|---|---|---|
| 3,846,563 | 11/1974 | Cunningham . |
| 4,394,397 | 7/1983 | Lometillo et al. . |
| 4,495,214 | 1/1985 | Seltzer et al. . |
| 4,540,592 | 9/1985 | Myer et al. . |
| 4,732,775 | 3/1988 | Millauer . |
| 5,059,439 | 10/1991 | Wenger et al. . |
| 5,296,253 | 3/1994 | Lusas et al. .............................. 426/629 |

Primary Examiner—Anthony J. Weier
Attorney, Agent, or Firm—Murray E. Thrift; Adrian D. Battison

[57] ABSTRACT

A high temperature extrusion process is provided for the production of legume pasta products. A dough mixture having a moisture content in the range of 15 to 40% is processed in a twin screw extruder or in a single screw extruder at a barrel temperature in the range of 70 to 135° C. and extruded through a die to form legume pasta products. The resulting products have a superior texture and integrity compared to legume pasta products produced by the traditional method.

35 Claims, 3 Drawing Sheets

| DP | DPH | HES | PT | T | VS | WF |
|---|---|---|---|---|---|---|
| Die Plate | Die Plate Holder | Heat Exchanger Section | Pressure Transducer | Thermocouple | Venting Section | Water Feeder |

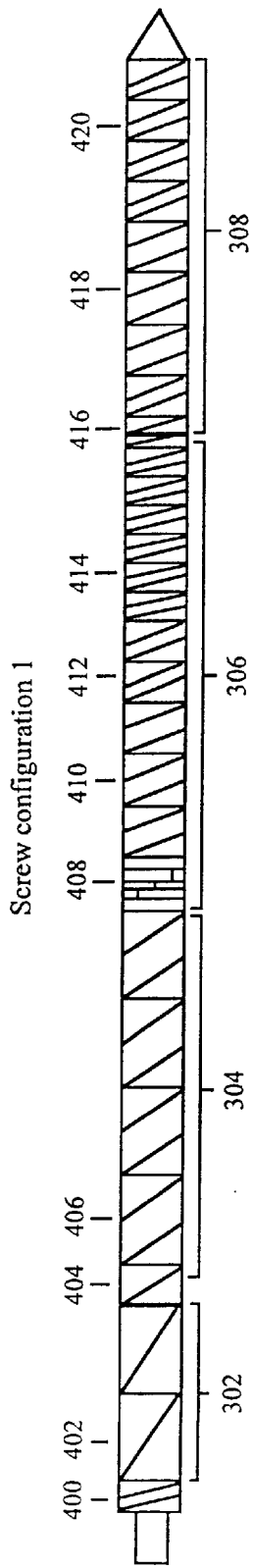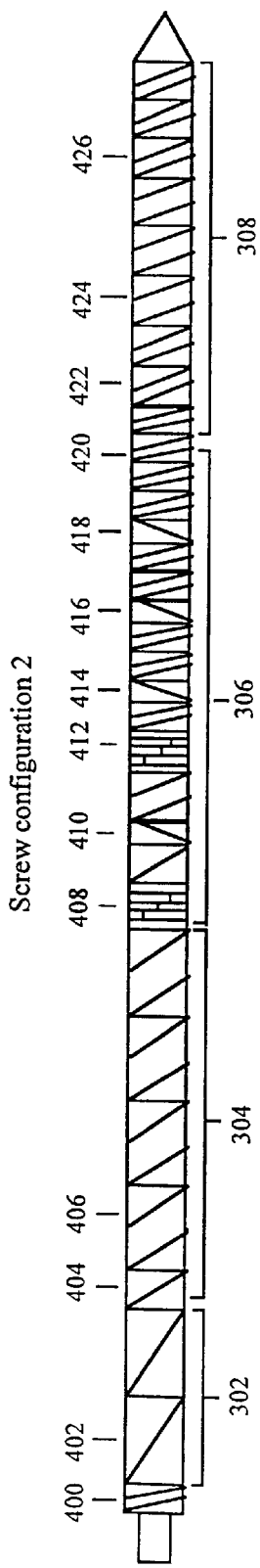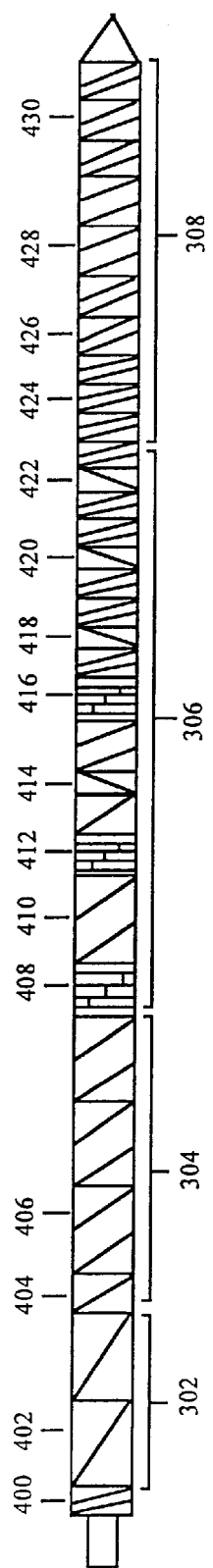

PRODUCTION OF LEGUME PASTA PRODUCTS BY A HIGH TEMPERATURE EXTRUSION PROCESS

The application claims the benefit of U.S. Provisional Application No. 60/026,411, filed Sep. 20, 1996.

FIELD OF THE INVENTION

The present invention is concerned with a process for the production of legume pasta products. The process of the invention involves the use of an extruder wherein the legume flour, water and any other ingredients are mixed, cooked and extruded through a die to yield the legume pasta products.

BACKGROUND OF THE INVENTION

Pasta, whether in the form of flat noodles, macaroni or any of a myriad of shapes and sizes, is consumed worldwide because it is economical, easy to prepare, shelf stable when dried, and can be served in many ways. Pasta products are traditionally manufactured by blending of wheat flour and water to form an homogeneous mixture, kneading of this mixture to form a dough, extruding of the dough into desired shapes at room temperature and at atmospheric pressure or under vacuum, and subsequent air drying of the extruded products for a period of time to provide a dried pasta product.

A small but significant proportion of the population cannot tolerate wheat gluten, which has been linked to a specific disorder of intestinal absorption, celiac disease. The treatment prescribed is a gluten-free diet, which is adequate in all nutrients, and a strict adherence to the diet. Pasta products on the market made solely from rice flour or corn flour in lieu of wheat flour or semolina do not adequately simulate chewability of the durum-based products, and have poor cooking quality. The use of starchy legume flours would be advantageous, since they are not only higher in protein and lysine content but are completely gluten-free.

In the applicants' laboratory, preparation of legume flour pasta on a regular pasta extruder has been attempted. However, the legume flour pasta had poor quality, particularly in terms of texture, flavor, and sensory properties. Significant disintegration of legume flour pasta during cooking was observed. Therefore, it would be desirable to provide a process for manufacturing legume pasta products with improved texture, flavor and good integrity during cooking.

Substantial efforts have been made in the past to develop "quick cooking" or "instant" wheat-based pasta products by extrusion cooking processes. U.S. Pat. No. 3,846,563 discloses quick cooking pasta products. They are produced by forming a dough containing at least 50% wheat flour, which is then formed into noodles by extrusion and the noodles are dried to a moisture content of less than 6%. U.S. Pat. No. 4,394,397 discloses an extrusion process for production of instant-cooking pasta products having a porous, cellular structure which enables the products to be rehydrated for consumption within a short period of time, and which exhibit good integrity, firm texture, and desirable flavor upon rehydration. U.S. Pat. No. 4,495,214 discloses a process for the production of quick cooking pasta products. The process comprises combining wheat flour, water, a carbonate, an acidic leavening salt and an interrupter to form a dough, extruding the dough through an extrusion cooker under conditions to react with the acidic leavening salt and at least partially to gelatinize the starch in the flour, and drying the extruded, formed pasta product. Methods and apparatus for preparing a precooked pasta product are disclosed in U.S. Pat. No 4,540,592. High temperature pumping and back mixing zones are utilized to form a gelatinized pasta dough by uniformly mixing a cereal flour and blending it with water. The dough is subjected to shearing conditions at elevated pressures and temperatures. U.S. Pat. No. 5,059,439 discloses an extrusion process for manufacturing a quick cooking wheat pasta product.

None of the prior art methods provides a process for making pasta products with legume flours. The present invention provides flexibility in producing legume pasta products with improved textural and flavor characteristics by high temperature extrusion cooking. The products can be produced quickly and economically by using a twin screw extruder or a single screw extruder.

SUMMARY OF THE INVENTION

According to the present invention, there is provided a process for preparing legume pasta products, said process comprising:

a) feeding a stock material comprising legume flour into a high temperature extruder;

b) mixing the stock material with water and steam in the extruder to form a dough mixture within the extruder;

c) cooking the stock material dough mixture in the extruder;

d) cooling the stock material dough mixture before it exiting the extruder;

e) extruding the dough mixture through a die to form a legume pasta product; and f) drying the legume pasta product.

If an extrusion apparatus is equipped with a preconditioner, the process for preparing legume pasta products includes the preliminary steps of:

a) feeding a stock material comprising legume flour into a preconditioner; and b) mixing the stock material with water and steam within the preconditioner.

The stock material is then fed from the preconditioner into the high temperature extruder.

The extruder apparatus used may be a single screw extruder or may be a twin screw extruder and would typically include a preconditioner, a barrel, dry ingredient feeders, water feeders and a die plate. Extruders that have proven useful include a Model ZSK 57 twin screw extruder (Werner & Pfleiderer, Ramsey, N.J.), an APV MPF 19 twin screw extruder (APV Baker Ltd., Staffordshire, UK), a Model TX 52 twin screw extruder (Wenger Manufacturing, Inc., Sabetha, Kans.) and a single screw Brabender extruder (Model 2002, C. W. Brabender Inc., South Hackensack, N.J.). The number, size and shape of the die orifices through which the dough mixture is extruded may be varied depending on the type of pasta product to be produced. Pasta products of the present invention have been produced using various die shapes including circular, rectangular, elbow macaroni, ziti, fettuccini or vermicelli shape. Various screw configurations may be used.

In an exemplary embodiment of the process, the legume flour is fed into the Model ZSK 57 extruder at a feed rate in the range of 22.7 to 31.8 kg/h and is then mixed with water which is metered into the extruder at different locations along the extruder barrel. The dough mixture in the extruder, preferably having a moisture content in the range of 15 to 40% by weight, is processed at barrel temperatures in the range of 70 to 135° C. The screw speed is in the range of 100 to 250 rpm. As the screws rotate, the dough travels the length of the barrel in which the dough is mixed, heated, pressurized, cooked and cooled. Heat is provided by the internal energy generated by the rotating of the screws and by externally heating the extruder barrel or by directly injecting steam into the barrel. The combined effects of mixing, mechanical shear and cooking within the extruder provide a gelatinized pasta dough. Generally, the dough may be subjected to processing within the extruder for a residence time in the range of about 25 to 120 sec, and subjected to an extrusion pressure in the range of about 240 to 1600 psi. The dough is extruded through dies which form the final desired pasta shapes. The pasta products from the extruder are then dried to a moisture content of about 8 to 12% at ambient temperature or at higher temperatures in the range of 45 to 80° C. in a dryer.

The legume flours may be whole pea flour, dehulled pea flour, air-classified pea flour fractions and pretreated pea flours, or may be similar flours from other starchy legumes, such as navy bean, chickpea, pinto bean, lentil, etc. It is also possible to use flours having various particle sizes, typically in the range 60 mesh to 325 mesh, or less than 325 mesh. Flours with increased particle size facilitate uniform mixing and cooking in the extruder and the resulting pasta products exhibit superior cooking quality and textural characteristics.

Optional ingredients such as surfactants like glyceryl monostearate or monoglycerides, partially hydrogenated vegetable oil, soy oil and corn oil may be included in the pasta mixture. These ingredients function mainly as lubricants which improve the extrudability of the dough mixture in the extruder. In addition to its lubricant function in the extrusion process, glyceryl monostearate may react with the protein and starch matrix to form a complex structure which reduces starch loss during cooking. Addition of glyceryl monostearate to the pasta dough mixture also improves the texture and reduces stickiness of the legume pasta product. A level of 0.1 to 4.0% by weight of the dry dough mixture can be used.

Other optional pasta ingredients such as salt, sodium bicarbonate, colorants, spices, and binders can also be incorporated into the pasta dough mixture. It was found that addition of sodium bicarbonate at a level of 0.1 to 1.0% by weight of the dry legume flour to the feed material increased the firmness of cooked pasta and reduced the stickiness of the cooked pasta product. Incorporation of binders such as hydroxypropylmethylcellulose (HPMC) (0.1–3.0% by weight of the dry legume flour) into the pasta mixture appears to reduce disintegration of the pasta product during cooking.

The dough mixture in the extruder is first subjected to increasing levels of temperature, pressure and shear, and then subjected to decreasing temperature in the last section of the extruder barrel. The individual sections of the barrel may be heated using electrical coils or via heat exchange with a circulating medium such as oil, water or steam passing through external jackets on the heated sections. The last section of the barrel may be cooled with tap water passing through the external jacket of the barrel. The purpose of cooling the dough in the last section of the barrel is to prevent expansion of the extruded pasta product as it exits the die due to evaporation of the water in the dough.

The pasta as it emerges from the extruder barrel is cooled, this being preferably carried out by using a fan, and cut into segments. The pasta is dried at ambient temperature or by passing through a multiple stage dryer/cooler. The resulting pasta normally has a moisture content of about 8 to 12%.

Compared to wheat-based pasta products, the legume pastas produced according to the invention contain twice the level of protein, are richer in lysine, and are gluten-free. Furthermore, the product exhibits superior integrity, flavor and texture after cooking, and greater tolerance to overcooking, than legume pasta products prepared by the conventional method.

BRIEF DESCRIPTION OF THE DRAWINGS

In the accompanying drawings, which illustrate exemplary embodiments of the present invention:

FIGS. 3a, 3b and 3c depict three screw configurations.

DETAILED DESCRIPTION

Figure 1:
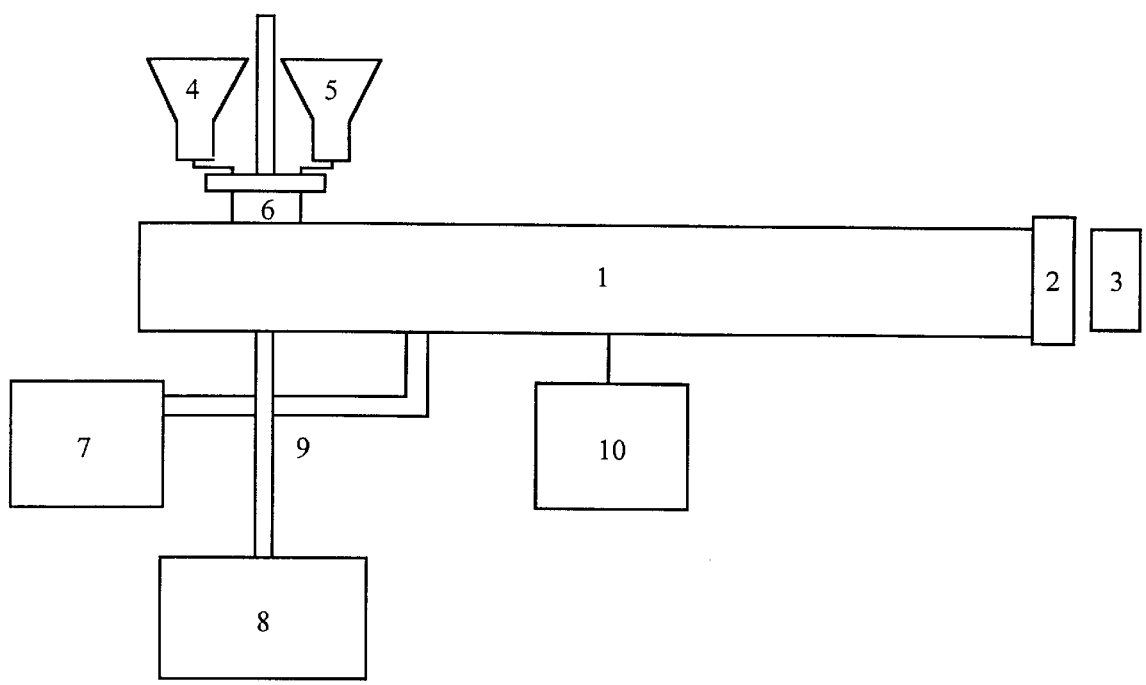
FIG. 1 is a schematic representation of a twin screw extruder system.

FIG. 1 illustrates schematically one of the extrusion apparatuses, Model ZSK 57, Werner & Pfleiderer, Ramsey, N.J., that has been used in the practice of the present invention. The apparatus includes an extruder 1 having a barrel enclosing two continuous intermeshing co-rotating screws and an inlet 6 located below the dry ingredient feeders 4 and 5. A die plate 2 and a cutter 3 are located at the end of the barrel. The legume flour stored in a dry ingredient storage bin 8 is conveyed to the dry ingredient feeders 4 and 5 by a screw conveyor 9. A heat exchanger 7 is used to heat the barrel. Water is injected into the extruder via a water pump 10. There is no preconditioner in this apparatus. The Wenger Manufacturing Inc. Model TX 52, is equipped with one.

Figure 2:
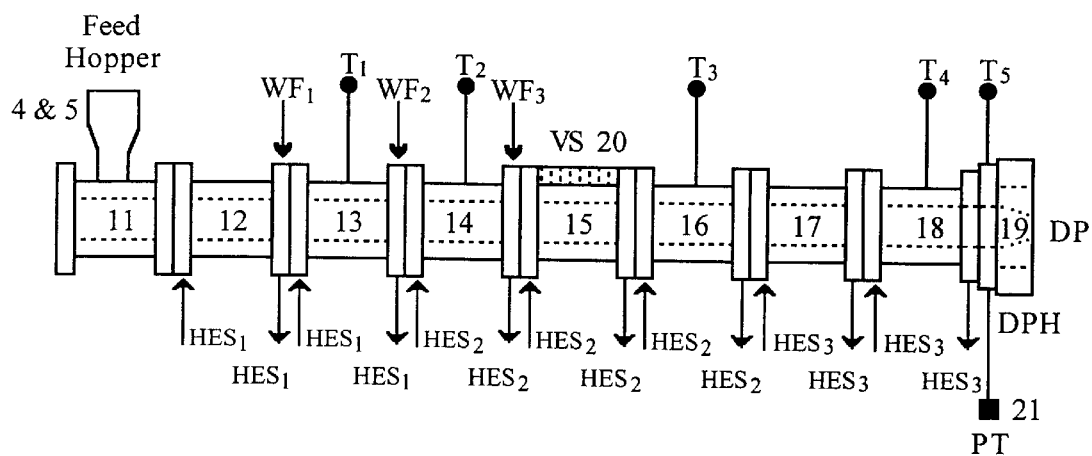
FIG. 2 illustrates the extruder barrel and the locations of the dry ingredient feeders, water feeders, thermocouples, pressure transducer, and heat exchanger inlets to and outlets from the barrel.

As shown in FIG. 2, the barrel comprises eight jacketed sections 11–18 which can be individually heated or cooled and a die plate holder 19. There are five thermocouples ($T_1$–$T_5$) along the barrel to monitor the temperature in the barrel at different sections. The pressure at the die is measured by a pressure transducer 21. There are also three water feeders ($WF_1$, $WF_2$ and $WF_3$) on the barrel to adjust the moisture content of the dough mixture in the extruder. The barrel is subdivided into a feeding/mixing zone (sections 11 and 12), a melting/cooking zone (sections 13–16) and a metering zone (sections 17 and 18). There is also a venting zone (section 15). The legume flour or mixture is introduced into the extruder 1 (FIG. 1) through inlet 6 (FIG. 1) and then mixed with water which is injected into the extruder at $WF_1$, $WF_2$, and $WF_3$ (FIG. 2) to form a mixture. The mixture then enters the melting/cooking zone (sections 13–16), where the mixture is worked into a moist dough. The temperature of the dough is rapidly elevated within the extruder barrel and the dough is cooked in this zone. Most of the heat is from mechanical energy dissipated through the rotating screws and from external heat exchangers, $HES_1$ and $HES_2$ (FIG. 2). In the Wenger Model TX 52, the cooked dough is transported to the venting zone (section 15) which incorporates an optional vacuum system to release steam and other volatile materials from the cooked dough. The cooked dough then enters the metering zone (sections 17 and 18) where the dough is cooled and extruded through the die 19 to yield a pasta product. Steam can also be injected directly into the extruder barrel to enhance the degree of cooking. An extruder having a venting section on the barrel is preferred since residual bitterness and pea flavor associated with pea and other legumes in the pasta product can be removed through venting.

Three screw configurations for the Werner & Pfleiderer Model ZSK 57 are illustrated in FIGS. 3a, 3b and 3c. The screws can be made up from a wide selection of different types of screw elements to perform different tasks, such as conveying, mixing, kneading and pressurization. In screw configuration 3 illustrated in FIG. 3c, screw segment 302 comprises two conveying screw elements which are single-flighted elements. Because of the wide crest of these elements, the transport of the flour from one screw to the other is reduced. Therefore, a certain axial conveying effect is enforced. Screw segment 304 consists of three multi-flighted elements which perform conveying and mixing functions. Screw elements 408, 412 and 416 in segment 306 are the kneading disks which provide high shear and intensive mixing action to the dough and enhance mechanical energy dissipation. Kneading disk 408 is a neutral staggered kneading disk which gives intensive mixing and shearing effects on the dough, but has no preferred direction of conveying. Kneading disks 412 and 416 are right-handed staggered kneading disks which have a positive direction of conveying and give intensive mixing and shearing effects on the dough. There are left-handed screw elements 414, 418, 420, and 422 in screw segment 306. These left-handed screw elements have a conveying effect in the upstream direction. Therefore, they are used to slow down or restrain the forward movement of the dough to allow the forward preceding screw segment to be filled up to obtain more intensive mixing and shearing. Screw segment 308, consisting of multi-flighted screw elements with different pitch and length, conveys and pressurizes the dough, and forces the dough through the die. The dough in this segment is thoroughly mixed and pressurized to assure uniformity of flow through the die openings. Screw configuration has significant effects on the physical, chemical and textural properties of pasta products. Screw configurations having more shearing and mixing effects are favored for the production of legume pasta products.

sections. The temperature in the metering zone of the extruder corresponding to the seventh and eighth barrel sections was maintained at 70 to 95° C. The pasta products were cut to length with a knife and dried at ambient temperature or in a dryer at a temperature in the range of 45 to 80° C. to a final moisture content of 8.5 to 10%. The characteristics of pea pasta products made according to the present invention are shown in Table 1. Bulk density was determined from the weight and volume of 1.0-cm-long pieces of pasta. Color of pasta was measured on a HunterLab Colour Difference Meter (ColorQUEST, Hunter Associates Laboratory Inc., Reston Va.) as L (brightness), a (red (+)/green (−)) and b (yellow (+)/blue (−)) values standardized with a white colour standard. Pasta was deemed cooked when the white core in strands pressed between two glass slides had disappeared. The time required to reach this point for each sample was regarded as its cooking time. Firmness, stickiness, compressibility and recovery of cooked pasta were measured using a TA-XT2 texture analyzer (Texture Technologies Corp., Scarsdale, N.Y.) interfaced with a computer including SMS1 software from Stable Micro Systems (Haslemere, UK).

TABLE 1

| Die size | Bulk density | Color | | | Cooking | Firmness | Stickiness | Compressibility | Recovery |
| --- | --- | --- | --- | --- | --- | --- | --- | --- | --- |
| (mm) | (g/cm$^3$) | L | a | b | time (min) | (g cm) | (N/m$^2$) | (%) | (%) |
| 1.2 | 1.86 | 41.97 | 14.21 | 22.86 | 7.5 | 9.2 | 1106.6 | 59.5 | 38.6 |
| 1.5 | 2.00 | 40.94 | 15.27 | 22.13 | 8.4 | 32.5 | 438.4 | 57.6 | 44.4 |

The pasta as it emerges from the extruder barrel is cooled, this being preferably carried out by using a fan, cut into segments, and dried at ambient temperature or at a temperature in the range of 45 to 80° C. by passing through a multiple stage dryer/cooler to a moisture content of about 8 to 12%.

The use of the extrusion apparatuses for the production of legume pasta products according to the present invention is exemplified in the following:

EXAMPLE 1

In this example, pea flour containing 11.9% moisture, 23.8% protein, 48.2% starch and 7.0% dietary fiber was fed to a co-rotating twin screw extruder (Model ZSK 57, Werner & Pfleiderer, Ramsey, N.J.) with a K-tron T-35 twin screw volumetric feeder (K-tron Corp., Glassboro, N.J.) at a rate of 22.7 kg/h. Water was introduced into the extruder at a rate of 6.7 kg/h to the extent that the final dough mixture had a moisture content of 32%. Two circular dies with diameters of 1.2 mm and 1.5 mm, respectively, were used. The screw configuration used in this test was of configuration 3 (FIG. 3c). The screws of the extruder were rotated at 125 rpm.

Temperatures of the barrel were set at 90° C. for the second and third sections, and 110° C. for the fourth to sixth

EXAMPLE 2

In this example, two pea flours having different particle sizes, smaller than 325 mesh (i.e. small enough to pass a 325 mesh screen) for the fine flour and 60–325 mesh for the coarse flour were used. The fine pea flour contained 11.2% moisture, 25.7% protein, 48.2% starch and 7.9% dietary fiber. The coarse pea flour had 11.9% moisture, 23.8% protein, 48.2% starch and 7.0% dietary fiber. The twin screw extruder used in this test was the same as that in Example 1. The feed rates for both of the flours to the extruder were the same, 22.7 kg/h. Water was introduced into the extruder at a rate of 6.7 kg/h for both the fine and coarse pea flours to the extent that the final dough mixtures had moisture contents of 32%. A circular die with a diameter of 1.2 mm was used in this test. The screw configuration used in this test was of configuration 3 (FIG. 3c). The screws of the extruder were rotated at 125 rpm.

The temperature profile along the barrel was the same as that used in Example 1. The pasta products were cut to length with a knife and dried at ambient temperature or in a dryer at a temperature in the range of 45 to 80° C. to a final moisture content of 8.5 to 10%. The characteristics of pea pasta products made according to the present invention are presented in Table 2.

TABLE 2

| Particle size | Bulk density | Color | | | Cooking | Firmness | Stickiness | Compressibility | Recovery |
| --- | --- | --- | --- | --- | --- | --- | --- | --- | --- |
| (mesh) | (g/cm$^3$) | L | a | b | time (min) | (g cm) | (N/m$^2$) | (%) | (%) |
| 60–325 | 2.10 | 41.57 | 13.57 | 22.67 | 7.3 | 9.3 | 1118.4 | 59.2 | 41.6 |
| >325 | 1.94 | 36.93 | 11.47 | 19.12 | 7.3 | 15.7 | 1735.2 | 57.3 | 47.6 |

EXAMPLE 3

Three pea flours, whole pea flour, dehulled pea flour and air-classified pea flour, were used in this example. The chemical compositions of the three flours are shown in Table 3. The pea flours were fed at a rate of 22.7 kg/h to the twin screw extruder as used in Examples 1 and 2. Water was introduced into the extruder at 7.7 kg/h for the whole pea flour, 6.7 kg/h for the dehulled pea flour and 7.7 kg/h for the air-classified pea flour to the extent that the final dough mixtures had moisture contents of 32%. The die and the screw configuration used in this test were the same as those used in Example 2. The screws of the extruder were rotated at 125 rpm.

TABLE 3

| Flour | Moisture (%) | Protein* (% db) | Starch (% db) | Fat (% db) | Ash (% db) | Dietary fiber (% db) |
| --- | --- | --- | --- | --- | --- | --- |
| Whole pea | 9.0 | 24.6 | 45.3 | 1.3 | 3.0 | 12.6 |
| Dehulled pea | 11.2 | 25.7 | 48.2 | 1.0 | 2.9 | 7.9 |
| Air-classified pea (ACP) | 9.2 | 12.3 | 69.1 | 0.4 | 1.6 | 4.8 |

The same temperature profile along the barrel as used in Example 1 was used in this test. The pasta products were cut to length with a knife and dried at ambient temperature or in a dryer at a temperature in the range of 45 to 80° C. to a final moisture content of 8.5 to 10%. The characteristics of pea pasta products made according to the present invention are presented in Table 4.

TABLE 4

| Pasta product | Bulk density (g/cm$^3$) | Color L | Color a | Color b | Cooking time (min) | Firmness (g cm) | Stickiness (N/m$^2$) | Compressibility (%) | Recovery (%) |
| --- | --- | --- | --- | --- | --- | --- | --- | --- | --- |
| Whole pea | 1.79 | 37.03 | 9.17 | 18.13 | 6.0 | 3.6 | — | 100 | 0.0 |
| Dehulled pea | 1.94 | 39.93 | 11.50 | 19.17 | 7.3 | 15.6 | 1735.2 | 57.3 | 46.6 |
| Air-classified pea (ACP) | 1.85 | 41.60 | 10.37 | 21.60 | 8.7 | 34.7 | 666.8 | 48.0 | 45.0 |

EXAMPLE 4

In this example, the starting pea flours were untreated pea flour (UNPF) and pea flours which had been steam treated in a vertical retort (Loveless Manufacturing Corp., Athens, Ga.) under atmospheric pressure at 100° C. for 10 or 20 min before being fed into the extruder. The chemical composition of the pea flours was the same as that used in Example 1. The moisture contents of the steam-treated flours were 12.9% for the 10 min steam treatment (ST1) and 13.9% for the 20 min steam treatment (ST2), respectively. The feed rates for the flours to the twin screw extruder (Model ZSK 57, Werner & Pfleiderer, Ramsey, N.J.) were the same, 22.7 kg/h. Water was introduced into the extruder at a rate of 6.4 kg/h for ST1, 6.0 kg/h for ST2 and 6.7 kg/h for the untreated pea flour to the extent that the final dough mixtures had moisture contents of 32%. The die and the screw configuration used in this test were the same as those used in Example 2. The screws of the extruder were rotated at 125 rpm.

The temperature profile along the barrel was the same as that used in Example 1. The pasta products were cut to length with a knife and dried at ambient temperature or in a dryer at a temperature in the range of 45 to 80° C. to a final moisture content of 8.5 to 10%. The characteristics of pea pasta products made according to the present invention are presented in Table 5.

TABLE 5

| Pasta product | Bulk density (g/cm$^3$) | Color L | Color a | Color b | Cooking time (min) | Firmness (g cm) | Stickiness (N/m$^2$) | Compressibility (%) | Recovery (%) |
| --- | --- | --- | --- | --- | --- | --- | --- | --- | --- |
| UNPF | 2.07 | 41.57 | 13.60 | 22.67 | 7.3 | 9.3 | 1118.4 | 59.2 | 41.6 |
| ST1 | 1.94 | 39.87 | 14.13 | 21.03 | 6.3 | 14.2 | 1160.0 | 91.6 | 16.3 |
| ST2 | 1.94 | 39.37 | 14.97 | 20.83 | 6.2 | 16.2 | 1421.2 | 87.7 | 15.6 |

EXAMPLE 5

In this example, an air-classified pea flour (ACP) containing 9.2% moisture, 12.3% protein, 69.1% starch and 4.8% dietary fiber was blended with 0.5% (w/w) sodium bicarbonate (SB) or 0.1% (w/w) glyceryl monostearate (GMS) or a combination of 0.5% (w/w) SB and 0.1% (w/w) GMS. The mixtures were then fed to the extruder (Model ZSK 57, Werner & Pfleiderer, Ramsey, N.J.) with a K-tron T-35 twin screw volumetric feeder (K-tron Corp., Glassboro, N.J.) at 22.7 kg/h. Water was introduced into the extruder at a rate of 7.85 kg/h to the extent that the final dough mixtures had moisture contents of 32%. A die with a diameter of 1.09 mm was used. The screw configuration used in this test was of configuration 3 (FIG. 3c). The screws of the extruder were rotated at 125 rpm.

The temperature profile along the barrel was the same as that used in Example 1. The pasta products were cut to length with a knife and dried at ambient temperature or in a dryer at a temperature in the range of 45 to 80° C. to a final moisture content of 8.5 to 10%. The characteristics of pea pasta products made according to the present invention are presented in Table 6.

EXAMPLE 7

In this example, the same pea flour as used in Examples 5 and 6, without addition of sodium bicarbonate (SB) or glyceryl monostearate (GMS), was fed to the twin screw extruder (Model ZSK 57, Werner & Pfleiderer, Ramsey, N.J.) with a K-tron T-35 twin screw volumetric feeder (K-tron Corp., Glassboro, N.J.) at 32.0 kg/h. Water was introduced into the extruder at a rate of 7.85 kg/h to the extent that the final dough mixture had a moisture content of 32%. A die with a diameter of 2.38 mm was used. The screw configuration used in this test was of configuration 2 (FIG. 3b). The screws of the extruder were rotated at 100 rpm.

TABLE 6

| Pasta product | Bulk density (g/cm³) | Color L | a | b | Cooking time (min) | Firmness (g cm) | Stickiness (N/m²) | Compressibility (%) | Recovery (%) |
|---|---|---|---|---|---|---|---|---|---|
| Air-classified pea (ACP) | 2.23 | 43.50 | 10.87 | 22.15 | 10 | 16.5 | 550.2 | 76.8 | 62.6 |
| ACP + SB | 1.62 | 44.18 | 10.06 | 22.67 | 10 | 17.1 | 277.2 | 72.8 | 65.1 |
| ACP + GMS | 2.26 | 39.52 | 8.22 | 19.11 | 10 | 12.1 | 264.3 | 80.7 | 59.8 |
| ACP + SB + GMS | 1.83 | 41.50 | 8.17 | 20.37 | 11 | 17.5 | 386.8 | 90.6 | 72.8 |

EXAMPLE 6

In this example, the same pea flour as used in Example 5, without addition of sodium bicarbonate (SB) or glyceryl monostearate (GMS), was fed to the co-rotating twin screw extruder (Model ZSK 57, Werner & Pfleiderer, Ramsey, N.J.) as with a K-tron T-35 twin screw volumetric feeder (K-tron Corp., Glassboro, N.J.) at 22.7 kg/h. Water was introduced into the extruder at a rate of 7.85 kg/h to the extent that the final dough mixture had a moisture content of 32%. A die with a diameter of 2.38 mm was used. The screw configuration used in this test was of configuration 1 (FIG. 3a). The screws of the extruder were rotated at 100 rpm.

Temperatures of the barrel were set at 110° C. for the second to sixth sections. The temperature in the metering zone of the extruder corresponding to the seventh and eighth barrel sections was maintained at 70 to 95° C. The pasta products were cut to length with a knife and dried at ambient temperature or in a dryer at a temperature in the range of 45 to 80° C. to a final moisture content of 8.5 to 10%. The characteristics of pea pasta made according to the present invention are presented in Table 7.

Temperatures of the barrel were set at 90° C. for the second to eighth sections. The pasta products were cut to length with a knife and dried at ambient temperature or in a dryer at a temperature in the range of 45 to 80° C. to a final moisture content of 8.5 to 10%. The characteristics of pea pasta made according to the present invention are presented in Table 8.

TABLE 8

| Bulk density (g/cm³) | Color L | a | b | Cooking time (min) | Firmness (g cm) | Stickiness (N/m²) | Compressibility (%) | Recovery (%) |
|---|---|---|---|---|---|---|---|---|
| 1.48 | 47.08 | 10.47 | 22.50 | 22 | 41.0 | 408.3 | 44.7 | 84.9 |

EXAMPLE 8

In this example, response surface methodology (RSM) was employed to optimize the extrusion process for the production of legume pasta products. Pea flour containing 11.9% moisture, 23.8% protein, 48.2% starch and 7.0% dietary fiber was used in this test. Raw material was fed into the extruder (Model ZSK 57, Werner & Pfleiderer, Ramsey, N.J.) with a K-tron T-35 twin screw volumetric feeder (K-tron Corp., Glassboro, N.J.). The feed rate was maintained at 22.7 kg/h, and water was introduced into the extruder at a rate of 4.45 to 7.85 kg/h to the extent that the final mixture had a moisture content of 25 to 39%. A die with a diameter of 1.5 mm was used. The screw configuration

TABLE 7

| Bulk density (g/cm³) | Color L | a | b | Cooking time (min) | Firmness (g cm) | Stickiness (N/m²) | Compressibility (%) | Recovery (%) |
|---|---|---|---|---|---|---|---|---|
| 1.24 | 51.35 | 9.88 | 21.30 | 18 | 31.4 | 103.2 | 63.8 | 69.8 | used in this test was of configuration 3 (FIG. 3c). The screws of the extruder were rotated at 100 to 150 rpm.

Temperatures of the barrel were set at 90° C. for the second and third sections, and 95 to 125° C. in the fourth to sixth sections. The temperature in the metering zone of the extruder corresponding to the seventh and eighth barrel sections was maintained at 85 to 90° C. The pasta products were cut to length with a knife and dried in a dryer at a temperature in the range of 45 to 80° C. to a final moisture content of 8 to 10%.

The optimization of legume pasta production by the high temperature extrusion process was based on the following criteria: cooking time (CT)$\leq$12 min, stickiness (Stick) $\leq$1200 N/m$^2$, firmness (Firm)$\geq$40 g cm, compressibility (Comp)$\leq$40% and recovery (Rec)$\geq$55%. Optimum extrusion process regions for legume pasta production were: dough moisture in the range of 34 to 39%, barrel temperature in the range of 118 to 125° C. and screw speed in the range of 125 to 150 rpm. The characteristics of pea pasta made at processing conditions (moisture content=36.2%; barrel temperature=119° C.; and screw speed=140 rpm) in the optimum processing region according to the present invention are presented in Table 9.

forwarding paddles (1.25D); 2 twin lead screws (2D); 4×30° forwarding paddles (1D); 1 twin lead screw (1D); 4 single lead screws (4D). The screws of the extruder were rotated at 200 rpm.

The extruder barrel consisted of five segmented heating zones with independently controlled electric cartridge heaters. The first segment provided an inlet for raw materials from the dry feeder to the extruder barrel. The temperature in the first segment was maintained at 40° C., the second and third segments at 110° C., and the fourth and fifth segments at 70 to 95° C. Barrel and product temperatures, die pressure, die temperature, percent motor torque, feed rate and screw speed were monitored. The pasta products were cut to length with a knife and dried at ambient temperature or in a dryer at a temperature in the range of 45 to 80° C. to a final moisture content of 8 to 10%. The characteristics of pea pasta products made according to the present invention are presented in Table 10.

TABLE 9

| Bulk density (g/cm$^3$) | Color | | | Cooking time (min) | Firmness (g cm) | Stickiness (N/m$^2$) | Compressibility (%) | Recovery (%) |
| --- | --- | --- | --- | --- | --- | --- | --- | --- |
| | L | a | b | | | | | |
| 1.81 | 40.28 | 14.96 | 21.16 | 11.0 | 60.3 | 805.9 | 38.9 | 68.7 |

TABLE 10

| Die shape | Bulk density (g/cm$^3$) | Color | | | Cooking time (min) | Firmness (g cm) | Stickiness (N/m$^2$) | Compressibility (%) | Recovery (%) |
| --- | --- | --- | --- | --- | --- | --- | --- | --- | --- |
| | | L | a | b | | | | | |
| Circular | 1.90 | 38.83 | 13.73 | 19.80 | 8.8 | 54.8 | 447.0 | 53.9 | 45.1 |
| Rectangular | 1.30 | 37.78 | 13.54 | 18.54 | 21.3 | 91.5 | 464.2 | 47.6 | 40.7 |

EXAMPLE 9

In this example, an APV MPF 19 co-rotating twin screw extruder (APV Baker Ltd., Staffordshire, UK) with a barrel length to diameter ratio of 25:1 was used. Pea flour containing 7.5% moisture, 20.8% protein, 53.5% starch and 8.1% dietary fiber was fed to the co-rotating twin screw extruder (APV MPF 19, APV Baker Ltd., Staffordshire, UK) with a K-tron T2V-T20 twin screw volumetric feeder (K-tron Corp., Glassboro, N.J.) at 3.0 kg/h. Water was introduced into the extruder at a rate of 1.08 kg/h to the extent that the final dough mixture had a moisture content of 32%. Dies of two different shapes were used, one circular in shape with a die diameter of 1.5 mm, and the other rectangular in shape with die dimensions of 1.0×3.0 mm. The screw configuration used in this test, where D is the barrel diameter, comprised (from feeding zone forward to the die): 5 twin lead screws (5D); 7×30° forwarding ¼ paddles (1.75D); 3 twin lead screws (3D); 4×30° forwarding paddles (1 D); 2×30° paddles (0.5D); 2 twin lead screws (2D); 2×30° forwarding paddles (0.5D); 2 twin lead screws (2D); 5×30°

EXAMPLE 10

In this example, the starting raw material was navy bean flour containing 9.7% moisture, 22.6% protein, 44.1% starch and 14.2% dietary fiber. The navy flour was fed to the twin screw extruder as used in Example 9 with the K-tron T2V-T20 twin screw volumetric feeder (K-tron Corp., Glassboro, N.J.) at a rate of 3.0 kg/h. Water was introduced into the extruder at a rate of 0.98 kg/h to the extent that the final dough mixture had a moisture content of 32%. A die with a diameter of 1.5 mm was used. The screw configuration used in this test was the same as that used in Example 9. The screws of the extruder were rotated at 200 rpm.

The temperature profile along the barrel was the same as that used in Example 9. The pasta products were cut to length with a knife and dried at ambient temperature or in a dryer at a temperature in the range of 45 to 80° C. to a final moisture content of 8 to 10%. The characteristics of navy bean flour pasta made according to the present invention are presented in Table 11.

TABLE 11

| Bulk density (g/cm³) | Color | | | Cooking time (min) | Firmness (g cm) | Stickiness (N/m²) | Compressibility (%) | Recovery (%) |
|---|---|---|---|---|---|---|---|---|
| | L | a | b | | | | | |
| 2.20 | 50.81 | 6.01 | 19.78 | 5.4 | 19.22 | 627.5 | 63.6 | 11.8 |

EXAMPLE 11

In this example, a twin screw, co-rotating extruder Model TX 52, Wenger Manufacturing Inc., Sabetha, Kans., was used. The extrusion apparatus consisted of a dry feeder, a preconditioner and an extruder with a length-to-diameter ratio of 25.5:1 having a barrel enclosing two continuous intermeshing co-rotating screws. Pea flour containing 7.0% moisture, 25.7% protein, 48.2% starch and 7.9% dietary fiber was blended with 0.60–0.75% of monoglycerides (Myvaplex 600, Eastman Chemical Company, Kingsport, Tenn.). The mixture was then introduced into the preconditioning cylinder from a dry feed bin by a volumetric feed screw at a rate of 75 kg/h. Steam was metered into the preconditioning chamber at about 25 kg/h and water at 9.6 kg/h. The preconditioner discharge temperature was 90° C. Double-straight paddles rotating at 150 rpm were used to manipulate the moistened mixture during preconditioning. The extruder barrel consisted of nine segmented zones. The first segment provided an inlet for the mixture of raw materials from the preconditioning cylinder. The sixth segment contained a venting section to release steam and other volatile materials. The temperature in the second and third segments was maintained at 40° C. The fourth through ninth segments were jacketed and heated with oil. The temperature in the fourth through sixth segments was maintained at 118° C. and the seventh through ninth at 90° C. Water was injected into the extruder barrel at 12.7 kg/h and steam at 14.0 kg/h. The extruder screw was operated at 160 rpm. Various dies (Wenger Manufacturing Inc., Sabetha, Kans.) were used to form pasta into elbow macaroni, ziti, fettuccini and vermicelli shapes. Pasta products were cut to length with a rotating single-bladed knife. Cut samples were transported by a pneumatic conveyor and a series of moving belts to a continuous double-pass dryer/cooler (Wenger Manufacturing Inc., Sabetha, Kans.). Pasta samples were retained in the dryer for about 45 min at 71° C. and were dried to a moisture content of 8 to 12%. The characteristics of pea pasta products made according to the present invention are presented in Table 12.

EXAMPLE 12

In this example, a single screw Brabender extruder (Model 2002, C. W. Brabender Inc., South Hackensack, N.J.) with a 20:1 barrel length to diameter ratio was used. There were two temperature control zones on the barrel. Heating was provided by electrical resistance elements and cooling by compressed air. The temperature at the feed section was kept as low as possible by circulating tap water through the cooling jacket which provided for smooth and uninterrupted feed flow. A screw with a compression ratio of 5:1 was used and operated at 55 rpm. A die with a diameter of 1.5 mm was used to form the pasta product. Pea flour containing 7.3% moisture, 25.7% protein, 48.2% starch and 7.9% dietary fiber was mixed with water in a Hobart food mixer (Model K45, Hobart Manufacturing Corp., Troy, Ohio) for 5 min to obtain the desired moisture content of 28.5%. The mixture was equilibrated overnight at 4° C. and then sieved through a 6 mesh screen. The granulated material was fed into the extruder using a vibratory feeder (Model F-TO, FMC Corp., Material Handling Equipment Division, Homer City, Pa.) at a rate of 3 kg/h.

The controlled temperature sections of the barrel were maintained at 90° C. for the first section and 11 0° C. for the second section. The temperature at the die was maintained at 70 to 95° C. The pasta products were cut to length with a knife and dried at ambient temperature or in a dryer at a temperature in the range of 45 to 80° C. to a final moisture content of 8.5 to 10%. The characteristics of pea pasta made according to the present invention are presented in Table 13.

TABLE 12

| Pasta product | Color | | | Cooking time (min) | Firmness[a] | Stickiness[a] | Chewiness[a] |
|---|---|---|---|---|---|---|---|
| | L | a | b | | | | |
| Elbow macaroni | 39.7 | 13.9 | 21.5 | 5.3 | 4.8 | 2.0 | 2.9 |
| Ziti | 39.5 | 14.1 | 21.5 | 4.8 | 4.7 | 1.9 | 2.6 |
| Fettuccini | 41.1 | 12.9 | 23.2 | 2.0 | 3.3 | 2.6 | 1.8 |
| Vermicelli | 37.3 | 14.1 | 21.2 | 4.1 | | 2.4 | 2.5 |

[a]Firmness, stickiness and chewiness were evaluated by a trained sensory panel. Firmness was evaluated by means of an eight-point structured scale (8 = extremely firm; 1 = extremely soft), whereas surface stickiness and chewiness were evaluated by means of five-point structured scales (5 = extremely sticky/chewy; 1 = not sticky/chewy).

TABLE 13

| Bulk density (g/cm³) | Color L | a | b | Cooking time (min) | Firmness (g cm) | Stickiness (N/m²) | Compressibility (%) | Recovery (%) |
|---|---|---|---|---|---|---|---|---|
| 1.33 | 40.7 | 12.8 | 19.5 | 12.8 | 17.5 | 606.1 | 63.0 | 31.1 |

EXAMPLE 13

In this example, two types of chickpea flours, Kabuli and Desi, were used. Kabuli and Desi flours contained 9.5% and 9.2% moisture, 24.3% and 25.8% protein, 43.7% and 42.4% starch and 10.1% and 8.8% dietary fiber, respectively. The single screw extruder, screw compression ratio, die, and screw speed were the same as those used in Example 12. Chickpea flour was mixed with water in the Hobart food mixer employed in Example 12 for 5 min to obtain the desired moisture content of 28.5%. The granulated materials prepared as described in Example 12 were fed into the extruder using the vibratory feeder at a rate of 3 kg/h.

The temperature profile along the extruder barrel was the same as that in Example 12. The characteristics of chickpea flour pasta products made according to the present invention are presented in Table 14.

TABLE 14

| Pasta product | Bulk density (g/cm³) | Color L | a | b | Cooking time (min) | Firmness (g cm) | Stickiness (N/m²) | Compressibility (%) | Recovery (%) |
|---|---|---|---|---|---|---|---|---|---|
| Kabuli type | 1.31 | 53.8 | 8.2 | 20.5 | 10.5 | 13.6 | 558.8 | 79.2 | 6.4 |
| Desi type | 1.32 | 48.8 | 10.7 | 20.8 | 10.6 | 27.8 | 704.9 | 78.4 | 11.6 |

EXAMPLE 14

In this example, pea flour containing 7.3% moisture, 25.7% protein, 48.2% starch and 7.9% dietary fiber was used. The single screw extruder was the same as that used in Examples 12 and 13. Four screws with compression ratios of 5:1, 3:1, 2:1 and 1:1 were used in this test. The screw was operated at 55 rpm. A die with a diameter of 1.5 mm was used to form the pasta product. Pea flour was mixed with water in the Hobart food mixer employed in Example 12 for 5 min to obtain the desired moisture content of 28.5%. The granulated material as prepared in Examples 12 and 13 was fed into the extruder using the vibratory feeder at a rate of 3 kg/h.

The temperature profile along the extruder barrel was the same as that in Examples 12 and 13. The pasta products were cut to length with a knife and dried at ambient temperature or in a dryer at a temperature in the range of 45 to 80° C. to a final moisture content of 8.5 to 10%. The characteristics of pea flour pasta products made according to the present invention are presented in Table 15.

EXAMPLE 15

In this example, pea flour containing 7.3% moisture, 25.7% protein, 48.2% starch and 7.9% dietary fiber was blended with hydroxypropylmethylcellulose (HPMC) products as a binder. Different hydroxypropylmethylcellulose (HPMC) products (Dow Chemical Company, Midland, Mich.), A4M, E4M, F4M and K4M, at a level of 1.0% (w/w), were incorporated into the pea flour. The composition of the cellulose derivatives, A4M, E4M, F4M and K4M, is shown in Table 16.

TABLE 16

| Material | Methoxyl degree of substitution | Methoxyl (%) | Hydroxypropyl Molar substitution | Hydroxypropyl (%) |
|---|---|---|---|---|
| A4M | 1.8 | 30 | — | — |
| E4M | 1.9 | 29 | 0.23 | 8.5 |
| E4M | 1.8 | 28 | 0.13 | 5.0 |
| K4M | 1.4 | 22 | 0.21 | 8.1 |

Compositions by courtesy of the Dow Chemical Company.

4M denotes a solution viscosity of 4000 mPas·s measured under standard conditions in a capillary viscometer. The initial letter 'A' denotes methylcellulose; 'E', 'F' and 'K' correspond to hydroxypropylmethyl derivatives with different levels of incorporation of the two substituents. The blend of pea flour and HPMC was mixed with water in a Hobart food mixer as employed in Examples 12,13 and 14 for 5 min to obtain the desired moisture content of 28.5%. The granulated materials as prepared in Examples 12, 13 and 14 were

TABLE 15

| Screw compression ratio | Bulk density (g/cm³) | Color L | a | b | Cooking time (min) | Firmness (g cm) | Stickiness (N/m²) | Compressibility (%) | Recovery (%) |
|---|---|---|---|---|---|---|---|---|---|
| 5:1 | 1.33 | 40.7 | 12.8 | 19.5 | 12.8 | 17.5 | 606.1 | 63.0 | 31.1 |
| 3:1 | 1.25 | 45.4 | 11.8 | 21.4 | 11.6 | 15.3 | 765.1 | 83.5 | 13.8 |
| 2:1 | 1.10 | 48.0 | 11.4 | 21.6 | 9.1 | 11.0 | 649.0 | 82.2 | 11.7 |
| 1:1 | 1.02 | 52.6 | 10.9 | 23.1 | 8.1 | 6.3 | 249.3 | 100 | 0.0 | fed into the single screw extruder as used in Examples 12, 13 and 14 using the vibratory feeder (Model F-TO, FMC, Corp., Material Handling Equipment Division, Homer City, Pa.) at a rate of 3 kg/h. A screw with a compression ratio of 5:1 was used in this test and operated at 55 rpm. A die with a diameter of 1.5 mm was used to form the pasta product.

The temperature profile along the extruder barrel was the same as that in Examples 12,13 and 14. The pasta products were cut to length with a knife and dried at ambient temperature or in a dryer at a temperature in the range of 45 to 80° C. to a final moisture content of 8.5 to 10%. The characteristics of pea pasta products made according to the present invention are presented in Table 17.

TABLE 17

| Pasta product | Bulk density (g/cm³) | Color L | a | b | Cooking time (min) | Firmness (g cm) | Stickiness (N/m²) | Compressibility (%) | Recovery (%) |
|---|---|---|---|---|---|---|---|---|---|
| Pea + A4M | 1.25 | 38.5 | 13.0 | 19.3 | 13.1 | 21.9 | 1005.8 | 69.0 | 17.2 |
| Pea + E4M | 1.38 | 38.3 | 13.0 | 18.9 | 12.9 | 21.3 | 973.6 | 73.0 | 11.0 |
| Pea + F4M | 1.33 | 38.7 | 13.0 | 19.2 | 13.6 | 28.4 | 825.3 | 83.9 | 9.2 |
| Pea + K4M | 1.34 | 39.8 | 13.1 | 19.5 | 13.1 | 20.6 | 1134.7 | 76.8 | 10.6 |

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A process for preparing legume pasta products, said process comprising:
   a) feeding a stock material comprising uncooked legume flour into a high temperature extruder;
   b) mixing the stock material with water in the extruder to form a dough mixture within the extruder;
   c) shearing and cooking the dough mixture in the extruder to produce a gelatinized pasta dough;
   d) venting volatiles from the cooked dough mixture in the extruder;
   e) cooling the cooked dough mixture in the extruder;
   f) extruding the cooled dough mixture through a die to form a legume pasta product; and
   g) drying the legume pasta product to a moisture content no greater than 12% by weight.

2. A process according to claim 1 comprising preliminary steps of:
   a) feeding the stock material comprising uncooked legume flour into a preconditioner; and
   b) mixing the stock material with water and steam within the preconditioner.

3. A process according to claim 1 wherein the legume flour has particle sizes sufficiently small to pass 60 mesh.

4. A process according to claim 3 wherein the particle sizes are in the range of 60 mesh to 325 mesh.

5. A process according to claim 3 wherein the particle sizes are sufficiently small to pass 325 mesh.

6. A process according to claim 1 wherein the legume flour is selected from one or more members of the group consisting of whole pea flour, dehulled pea flour and air-classified pea flour fraction.

7. A process according to claim 6 wherein the legume flour has particle sizes sufficiently small to pass 60 mesh.

8. A process according to claim 7 wherein the particle sizes are in the range of 60 mesh to 325 mesh.

9. A process according to claim 7 wherein the particle sizes are sufficiently small to pass 325 mesh.

10. A process according to claim 1 wherein the legume flour is a starchy legume flour.

11. A process according to claim 10 wherein the legume flour is selected from one or more members of the group consisting of navy bean flour and chickpea flour.

12. A process according to claim 11 wherein the legume flour has particle sizes sufficiently small to pass 60 mesh.

13. A process according to claim 11 wherein the particle sizes are in the range of 60 mesh to 325 mesh.

14. A process according to claim 11 wherein the particle sizes are sufficiently small to pass 325 mesh.

15. A process according to claim 1 comprising a preliminary step of pre-treating the legume flour with heat.

16. A process according to claim 15 comprising the preliminary step of pre-treating the legume flour with steam.

17. A process according to claim 1 further comprising adding a surfactant to the stock material.

18. A process according to claim 17 wherein the surfactant is selected from the group consisting of glyceryl monostearate and monoglycerides.

19. A process according to claim 17 comprising adding the surfactant to the stock material in an amount in the range 0.1 to 4.0% by weight of the dry legume flour.

20. A process according to claim 1 further comprising adding to the stock material an ingredient selected from the group consisting of salt, sodium bicarbonate and binders.

21. A process according to claim 20 comprising adding sodium bicarbonate to the stock material in an amount in the range of 0.1 to 1.0% by weight of the dry legume flour.

22. A process according to claim 1 further comprising adding hydroxypropylmethylcellulose (HPMC) to the stock material.

23. A process according to claim 22 comprising adding HPMC to the stock material in an amount in the range of 0.1 to 3.0% by weight of the dry legume flour.

24. A process according to claim 1 comprising cooking the dough mixture at a barrel temperature in the range of 70 to 135° C.

25. A process according to claim 1 wherein the dough mixture has a moisture content in the range of 15 to 40% by weight.

26. A process according to claim 1 comprising cooling the dough mixture to a temperature in the range of 70 to 95° C. before it exits the die.

27. A process according to claim 1 comprising processing the dough mixture in the extruder for a residence time in the range of 25 to 120 sec.

28. A process according to claim 1 comprising the step of mixing the stock material with sufficient water to provide a moisture content in the range of 20 to 35% by weight before the stock material is fed into the extruder.

29. A process according to claim 1 comprising extruding the dough mixture through die apertures with diameters in the range of 1.00 mm to 2.38 mm.

30. A process according to claim 1 comprising extruding the dough mixture through a die with orifices in a rectangular shape with dimensions of 1.0×3.0 mm.

31. A process according to claim 1 comprising drying the legume pasta product to a final moisture content in the range 8 to 12%.

32. A process according to claim 31 comprising drying the pasta at ambient temperature.

33. A process according to claim 22 comprising drying the pasta in a dryer at a temperature in the range of 45 to 80° C. for a time in the range 15 to 90 minutes.

34. A process according to claim 1 wherein the venting of volatiles is carried out at atmospheric pressure.

35. A process according to claim 1 wherein the venting of volatiles is carried out under vacuum.

* * * * *